US009992013B2

(12) United States Patent
Georgieva et al.

(10) Patent No.: US 9,992,013 B2
(45) Date of Patent: Jun. 5, 2018

(54) SYSTEM AND METHOD FOR PROVIDING DEFENCE TO A CRYPTOGRAPHIC DEVICE AGAINST SIDE-CHANNEL ATTACKS TARGETING THE EXTENDED EUCLIDEAN ALGORITHM DURING DECRYPTION OPERATIONS

(71) Applicant: GEMALTO SA, Meudon (FR)

(72) Inventors: Mariya Georgieva, Meudon (FR); Frederic De Portzamparc, Paris (FR)

(73) Assignee: GEMALTO SA, Meudon (FR)

( * ) Notice: Subject to any disclaimer, the term of this patent is extended or adjusted under 35 U.S.C. 154(b) by 181 days.

(21) Appl. No.: 15/078,869

(22) Filed: Mar. 23, 2016

(65) Prior Publication Data

US 2017/0279600 A1    Sep. 28, 2017

(51) Int. Cl.
*H04K 1/00* (2006.01)
*H04L 9/00* (2006.01)
*H04L 9/30* (2006.01)
*G06F 7/72* (2006.01)

(52) U.S. Cl.
CPC .............. *H04L 9/003* (2013.01); *G06F 7/726* (2013.01); *H04L 9/3026* (2013.01)

(58) Field of Classification Search
CPC ........ H04L 9/003; H04L 9/3026; G06F 7/726
USPC .......................................................... 380/28
See application file for complete search history.

(56) References Cited

U.S. PATENT DOCUMENTS

| 4,958,348 A | 9/1990 | Berlekamp et al. |
| 2012/0057695 A1* | 3/2012 | Lazich .................... G06F 7/724 380/28 |
| 2016/0013931 A1* | 1/2016 | Pisek .................... H04L 9/0631 380/28 |

OTHER PUBLICATIONS

Toward Secure Implementation of McEliece Decryption, 2015, Mariya Georgieva and Frédéric de Portzamparc, Gemalto—Security Lab, Meudon, France.

* cited by examiner

*Primary Examiner* — Mohammad W Reza
(74) *Attorney, Agent, or Firm* — The Jansson Firm; Pehr B. Jansson

(57) ABSTRACT

A system, method and computer-readable storage medium for decrypting a code c using a modified Extended Euclidean Algorithm (EEA) having an iteration loop independent of the Hamming weight of inputs to the EEA and performing a fixed number of operations regardless of the inputs to the EEA thereby protecting a cryptographic device performing the decryption from side-channel attacks.

20 Claims, 7 Drawing Sheets

601

Input: $a(z), b(z), \deg(a) \geq \deg(b), d_{fin}$
Output: $u(z), r(z)$ with $b(z)u(z) = r(z) \mod a(z)$ and $\deg(r) \leq d_{fin}$ 1: $r_{-1}(z) \leftarrow a(z), r_0(z) \leftarrow b(z), u_{-1}(z) \leftarrow 1, u_0(z) \leftarrow 0,$
2: $i \leftarrow 0$
3: while $\deg(r_i(z)) > d_{fin}$ do
4:    $i \leftarrow i + 1$
5:    $q_i \leftarrow r_{i-2}(z)/r_{i-1}(z)$
6:    $r_i \leftarrow r_{i-2}(z) - q_i(z)r_{i-1}(z)$
7:    $u_i \leftarrow u_{i-2}(z) - q_i(z)u_{i-1}(z)$
8: end while
9: $N \leftarrow i$
10: return $u_N(z), r_N(z)$

Input: $a(z) = z^{2t}, b(z) = S_w(z), d = 2t$
Output: $\hat{U}_d(z) = \mu z^{d-w_H(e)+1}\sigma_{tw_e}(z), \hat{R}_d(z) = \mu z^{d-w_H(e)+1}\omega_e(z)$ for some $\mu \in \mathbb{F}_{q^m}^*$.

1: $\hat{R}_{-1}(z) \leftarrow a(z), \hat{R}_0(z) \leftarrow zb(z)$.
2: $\hat{U}_{-1}(z) \leftarrow 1, \hat{U}_0(z) \leftarrow 0$.
3: $\delta \leftarrow -1$.
4: for $j = 1, \ldots, d$ do
5:     $\alpha_j \leftarrow \hat{R}_{j-1,d}, \beta_j \leftarrow \hat{R}_{j-2,d}$.
6:     $temp_R(z) \leftarrow z\left(\alpha_j \hat{R}_{j-2}(z) - \beta_j \hat{R}_{j-1}(z)\right)$.
7:     $temp_U(z) \leftarrow z\left(\alpha_j \hat{U}_{j-2}(z) - \beta_j \hat{U}_{j-1}(z)\right)$.
8:     if $\alpha_j = 0$ (ie $\deg(\hat{R}_{j-1}) < \deg(\hat{R}_{j-2})$) then
9:        $\delta \leftarrow \delta + 1$.
10:     else
11:        $\delta \leftarrow \delta - 1$.
12:     end if
13:     if $\delta < 0$ then
14:        $(\hat{R}_j(z), \hat{R}_{j-1}(z)) \leftarrow (\hat{R}_{j-1}(z), temp_R)$
15:        $(\hat{U}_j(z), \hat{U}_{j-1}(z)) \leftarrow (\hat{U}_{j-1}(z), temp_U)$
16:        $\delta \leftarrow 0$.
17:     else
18:        $(\hat{R}_j(z), \hat{R}_{j-1}(z)) \leftarrow (temp_R, \hat{R}_{j-2}(z))$
19:        $(\hat{U}_j(z), \hat{U}_{j-1}(z)) \leftarrow (temp_U, \hat{U}_{j-2}(z))$
20:        $\delta \leftarrow \delta$.
21:     end if
22: end for
23: return $\hat{U}_d(z), \hat{R}_d(z)$ $\}L$

*Fig. 7*

SYSTEM AND METHOD FOR PROVIDING DEFENCE TO A CRYPTOGRAPHIC DEVICE AGAINST SIDE-CHANNEL ATTACKS TARGETING THE EXTENDED EUCLIDEAN ALGORITHM DURING DECRYPTION OPERATIONS

BACKGROUND OF THE INVENTION

The present invention relates generally to electronic cryptography technology, and in particular to protecting a security device against side-channel attacks directed against computations of the Extended Euclidean Algorithm during decryption operations.

Electronic communication and commerce can be powerful yet dangerous tools. With the wide-spread availability of network technology, such as the Internet, there is an ever increasing use of online tools for communication and commerce. Every year more users find it easier or quicker to conduct important transactions, whether in the form of correspondence or commerce, using computers and computer networks. However, there is always the risk that the security of electronic transactions is compromised through interception by third parties who do not have the right to partake in the transactions. When malicious third parties obtain access to otherwise private transactions and data there is risk of economic loss, privacy loss, and even loss of physical safety. Cryptography is one mechanism employed to avoid intrusion into the privacy of electronic transactions and data.

Cryptography is a technology for hiding a message in the presence of third parties using mathematical techniques in which a message is encrypted in such a way that it can only be decrypted using a secret key that should only be known by the recipient and/or sender of a message.

Cryptographic algorithms have inputs and outputs. In the case of encryption, the input is a message that is to be protected in plaintext. The plaintext message is manipulated by the cryptographic algorithm to produce a ciphertext, the output. To produce the ciphertext the cryptographic algorithm performs certain mathematical operations that include the use of a secret key. The key may be a shared secret, e.g., between a sender and recipient, or may be a private key held by the recipient.

Traditionally, both sender and recipient of a cryptographic message was considered secure. Cryptography's primary use was to transmit an encoded message from the sender to the recipient without fear that an intermediary would be able to decode the message. If an attacker has no access to the sender's or recipient's cryptography devices, the attacker is limited to using the encoded message itself, or possible an encoded message and a corresponding plaintext message, to discern the cryptographic key used to encode or decode the message. However, if the attacker has access to the cryptographic device, the picture changes dramatically.

One mechanism of ensuring that a private key is indeed kept private is to store the private key and any related key material on a secure portable device, e.g., a smart card or a mobile device. A smart card is a small tamper resistant computer often in the form of a credit card sized and shaped package. Smart cards may be used to store cryptographic keys and cryptography engines for performing encryption, decryption, and digital signatures.

In one example, a user may receive an encrypted message and uses his smart card to decrypt the message by first authenticating to the smart card and then passing the message to the smart card for decryption. If authentication is successful, the smart card may use a cryptographic key stored on the card, and a corresponding cryptography engine, to decrypt the message and provide the decrypted message to the user. Similarly, if a user wishes to cryptographically sign a message, the user may pass the message to the user's smart card, which uses a cryptographic key of the user to digitally sign the message and to provide the signature back to the user or to a third party recipient.

If an attacker has access to the smart card, the attacker may make repeated observations of the execution of the cryptographic algorithms that may be used to discern the secrets stored on the smart card, specifically secret cryptographic keys stored on the smart card. One such attack is the so-called side-channel attack.

Side-channel attacks make use of the program timing, power consumption and/or the electronic emanation of a device that performs a cryptographic computation. The behavior of the device (timing, power consumption and electronic emanation) varies and depends directly on the program and on the data manipulated in the cryptographic algorithm. An attacker could take advantage of these variations to infer sensitive data leading to the recovery of a private key.

Many currently popular assymetric crypto systems, e.g., the RSA ([Rivest] Rivest, Shamir, and Adleman (A Method for Obtaining Digital Signatures and Public-Key Cryptosystems, MIT Memo MIT/LCS/TM-82, 1977. https://people.csail.mit.edu/rivest/Rsapaper.pdf, accessed, Mar. 10, 2016), derive their security from the difficulty of factoring integers and finding the discrete log of a number. However, such systems are somewhat inefficient due to the requirement of raising a number to a power and their cryptographic primitives are somewhat vulnerable to attack on quantum computers. For example, integer factorization of products of large prime numbers, the foundation of many public key cryptography systems, is considered computationally infeasible on ordinary digital computers, yet may be solved relatively efficiently on quantum computers.

Code based cryptography, introduced by R. McEliece in 1978 is a potential candidate to replace the asymmetric primitives, which are threatened by quantum computers ([McEliece] McEliece, Robert J. (1978). "*A Public-Key Cryptosystem Based On Algebraic Coding Theory*" (PDF). *DSN Progress Report* 44: 114-116. Bibcode: 1978DSNPR . . . 44 . . . 114M, http://ipnpr.jpl.nasa.gov/progress_report2/42-44/44N.PDF, accessed on, Mar. 16, 2016). The family of codes proposed by McEliece, namely the binary Goppa codes has been considered secure for more than 30 years and allows very fast encryption. Relying on other assumptions than number-theory problems such as the discrete logarithm problem and integer factorization is a very positive characteristic of code based primitives. Its major drawback lies in the size of the public keys.

Code-based cryptography relies on the hardness of decoding, that is recovering a message m and an error e when given only the encoded message c, where c=mG+e and G (for m in $F_q^k$, G in $F_q^{kn}$ and e in $F_q^n$). The error weight is critical for security. Contrary to the public parameters of the code, which are fixed at set up by an external entity, the error may vary at each encryption, and may even be chosen by any public user in some situations.

One drawback to code based cryptography is vulnerability to side-channel attacks. The vulnerability arises in most of the implementations of McEliece cryptography, because the operation flow of the decryption is strongly influenced by the error vector, but no information is known about the error vector when starting decryption. From an attacker's point of view, this is a favorable situation. It means that the observed or manipulated device may leak information before any detection of the attack. These security aspects were addressed by various authors, who explained that a device implementing an unprotected decryption is prone to attacks on the messages (see e.g., [Shofan] A. Shoufan, F. Strenzke, H. G. Molter, and M. Stottinger. A Timing Attack against Patterson Algorithm in the McEliece P K C. In D. Lee and S. Hong, editors, ICISC, volume 5984 of Lecture Notes in Computer Science, pages 161-175. Springer, 2009; [Avanzi] R. Avanzi, S. Hoerder, D. Page, and M. Tunstall. Side-channel attacks on the McEliece and Niederreiter public-key cryptosystems. J. Cryptographic Engineering, 1(4):271-281, 2011). and on the key (See e.g., [Strenzke 2010] F. Strenzke. A Timing Attack Against the Secret Permutation in the Mceliece PKC. In *Proceedings of the Third International Conference on Post-Quantum Cryptography*, PQCrypto'10, pages 95-107, Berlin, Heidelberg, 2010. Springer-Verlag; [Strenzke 2013] F. Strenzke. Timing Attacks against the Syndrome Inversion in Code-Based Cryptosystems. In P. Gaborit, editor, *PQCrypto*, volume 7932 of *Lecture Notes in Computer Science*, pages 217-230. Springer, 2013.). Although countermeasures were proposed against some of the leakages, the situation is still unsatisfactory, as it is noticed in the conclusion of [Strenzke 2013].

The McEliece Cryptosystem is described in [Au] Au, Susanne et al., The McEliece Cryptosystem, http://www.math.uml.edu/~s-jeverso2/McElieceProject.pdf, accessed on Mar. 10, 2016 and in [Georgieva] Georgieva, Mariya and de Portzamparc, Frédéric, Toward Secure Implementation of McEliece Decryption, COSADE 2015, https://www.cosade.org/proceedings/paper_S04_3.pdf, accessed on Mar. 10, 2016, incorporated herein by reference.

In summary, in the McEliece cryptosystem, decoding of an encoded message c requires the determination of the error e. The principal methods for obtaining the error e include using the Extended Euclidean Algorithm (EEA) to compute an error locator polynomial $\sigma(z)$. More details of the EEA are provided herein below. The EEA is particularly vulnerable to side-channel attacks, for example, because the execution time of the EEA depends on the Hamming weight of the error e. Thus, side-channel leakages may be used to deduce possible values for e.

Prior efforts to protect a cryptography device performing McEliece decryption include efforts to ensure that the EEA computation performs a computation both on the ciphertext c and on a twisted ciphertext $c^{*i}$ such that the execution time for c and $c^{*i}$ are the same ([Shoufan]). However, such a defense does not protect against other leakages besides execution time.

Strenske ([Strenzke 2013] and [Strenske 2010] studied the security execution of the McEliece decryption in the special case of decoding errors of weight 4 or 6. However, Strenske did not provide a countermeasure applicable to the general case.

From the foregoing it will be apparent that, while McEliece cryptography provides an attractive alternative to RSA and other popular assymetric cryptography systems, there is still a need for an improved technology to provide a secure mechanism that is computationally efficient, that does not provide side-channel leakage that may be exploited in side-channel attacks to deduce the error e in the encoding of a message m when performing cryptographic operations using the Extended Euclidean Algorithm, for example, decryption of McEliece codes.

BRIEF DESCRIPTION OF THE DRAWINGS

FIG. 6 is a pseudocode section illustrating the standard method for performing an Extended Euclidean Algorithm as may be employed in decryption of a message in the McEliece cryptography system FIG. 7 is a pseudocode section illustrating a modified Extended Euclidean Algorithm (EEA) that when employed by a cryptography device implementing the McEliece cryptography system renders the cryptography device less prone to side-channel attack targeting the EEA.

DETAILED DESCRIPTION OF THE INVENTION

Figure 1:
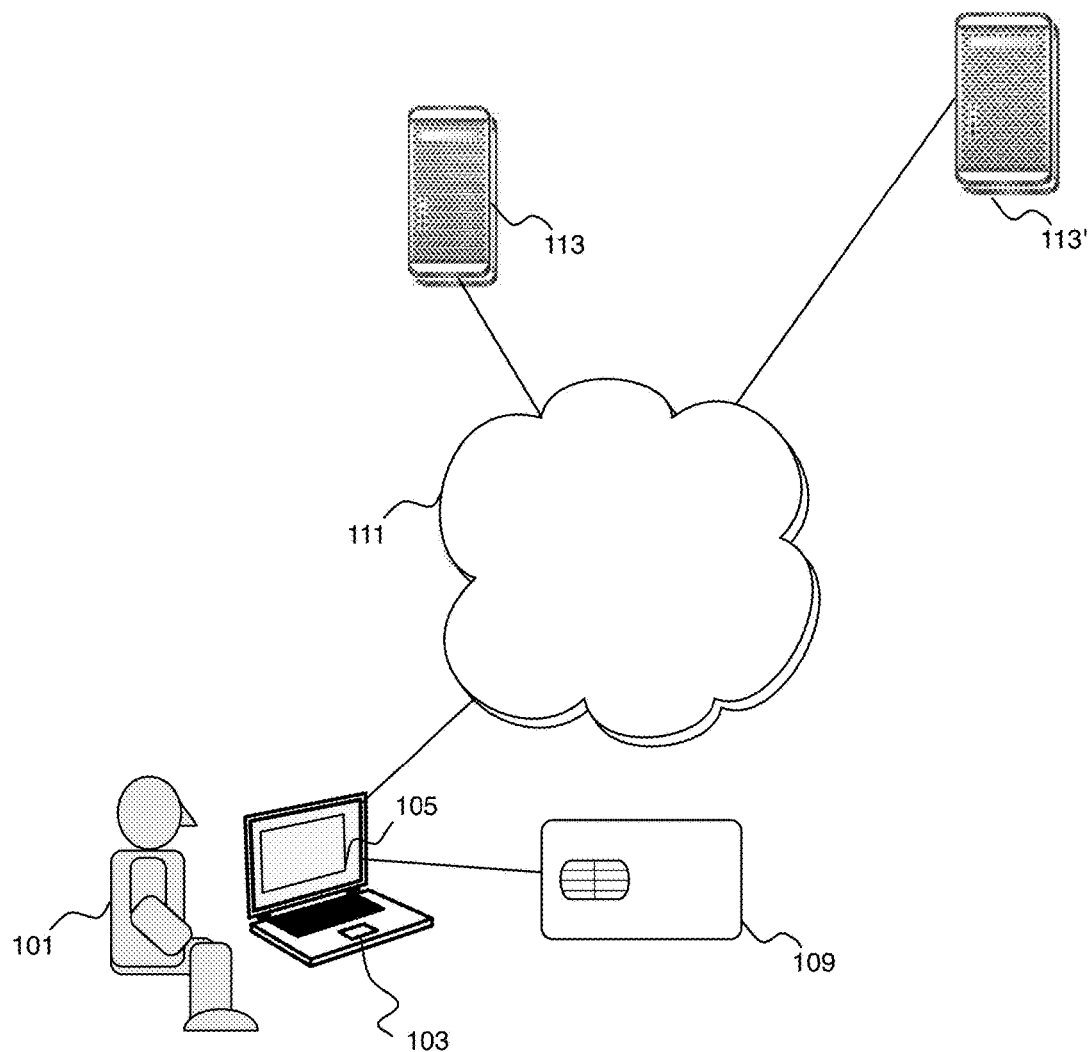
FIG. 1 is a schematic illustration of a host computer with a portable security device, e.g., a smart card, connected thereto for performing cryptographic services through connection over a network to one or more servers.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is provided that enables the use of smart cards, or other portable security devices, to be used to digitally sign documents or to decrypt encrypted documents or messages using private keys stored on the smart cards in a manner that efficiently reduces the risk of differential power analysis attacks.

Smart cards are plastic cards with an embedded microprocessor and a secure storage. They are portable, secure, and tamper-resistant. Smart cards provide security services in many domains including telecommunication, banking, commerce, and citizen identity. Smart cards can take different forms, such as credit card shaped cards with electrical connectors to connect the smart card to a smart card reader, USB tokens with embedded smart cards, and SIM cards for use in mobile telephones and tablet devices. Smart cards are used herein as examples of portable security devices that may be used in implementations of the technology described herein. Other examples of portable security devices include smart memory cards, flash memory, etc. In a preferred embodiment, the portable security device has a processor, a memory for storing programs and data, and some security features to make the device relatively tamper-proof. Smart cards are used herein as examples of such devices.

While the mechanism for masking a cryptographic calculation described herein may be used advantageously in smart cards and other portable security tokens used for performing cryptographic calculations, the same mechanisms may also be used with other cryptographic processors. Thus, smart cards are used herein for illustrative purposes only.

Cryptographic operations, such as encryption and decryption, are examples of functions that smart cards provide. The smart card stores private or shared secret keys in its secure storage and performs cryptographic operations to generate a digital signature for a given input or to decrypt a given input. A smart card works with a host device, such as a personal computer (PC), cell phone, tablet device or banking terminal. A PC application, such as an email client or a web browser, typically works with a smart card to sign, encrypt, or decrypt a document. The cryptographic operation may be part of a challenge-response mechanism for user authentication. The PC application and the smart card interact through some cryptographic API called middleware, which is designed to communicate with the smart card. In this scenario, the smart card provides services locally to the PC.

FIG. 1 is a schematic illustration of a network 111 connecting a host computer 103 with a portable security device 109, e.g., a smart card, connected thereto, to one or more remote servers 113. The host computer 103 is operated by a user 101 who interacts with one of the servers 113 via a web browser window 105 of a web browser. In the example scenario illustrated in FIG. 1, the smart card 109 provides the cryptographic operations on behalf of the user 101, e.g., to cryptographically sign documents, to decrypt messages received from the relying party 113, or to perform a cryptographic operation as part of a challenge-response authentication mechanism.

While FIG. 1 provides an illustration of a scenario in which cryptography may play an important role, there are many other important uses for cryptography. Thus, the technology described herein is not limited in its application to the example of use, which is illustrated in FIG. 1.

Figure 2:
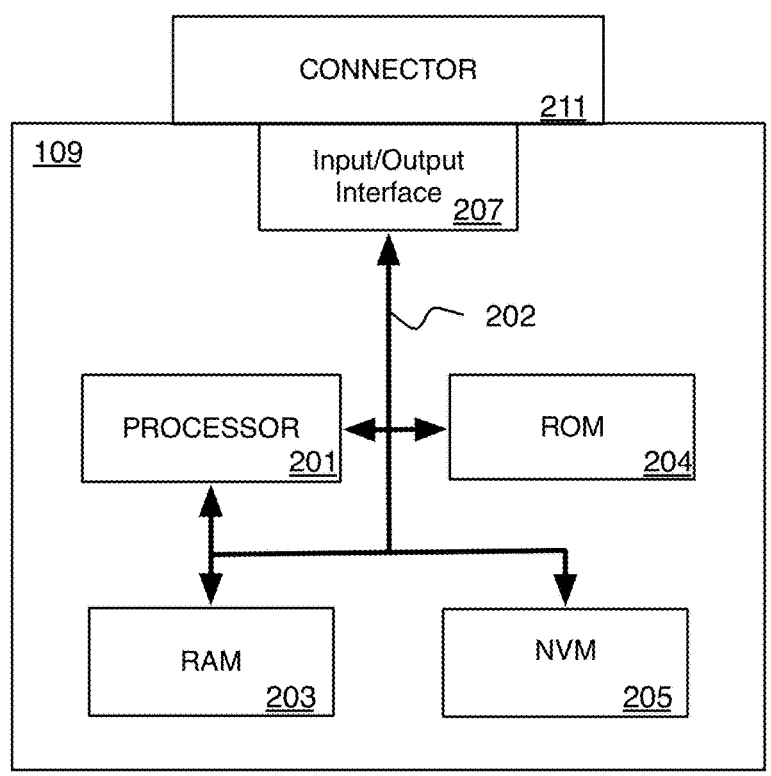
FIG. 2 is a schematic illustration of a portable security device.

FIG. 2 is a schematic illustration of a portable security device 109, for example, a smart card. The portable security device 109 may include a processor 201 connected via a bus 202 to a random access memory (RAM) 203, a read-only memory (ROM) 204, and a non-volatile memory (NVM) 205. The portable security device 109 further includes an input/output interface 207 for connecting the processor 201, again typically via the bus 202, to a connector 211 by which the portable security device 109 may be connected to the host computer 103.

In alternative embodiments, the connection between the host computer 103 and the portable security device 109 is wireless, for example, using near-field communication (NFC) or other radio or microwave communication technologies.

Figure 3:
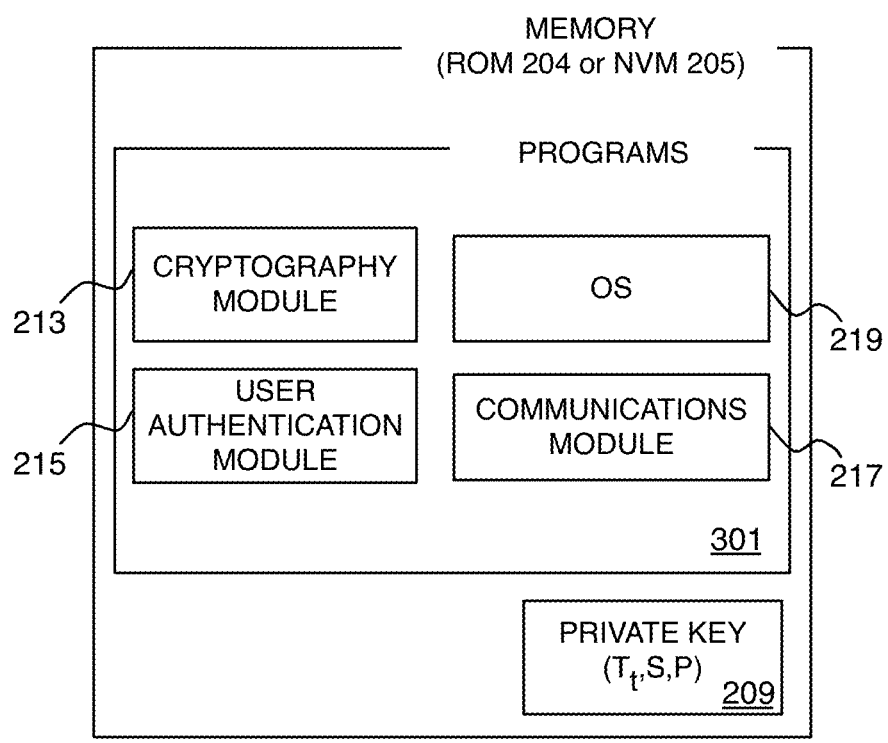
FIG. 3 is a schematic illustration of programs stored in a memory of the portable security device of FIG. 2.

The NVM 205 and/or ROM 204 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. Furthermore, the portable security device 109 may include multiple ROMs or NVMs. The programs 301 include operating system programs as well as application programs loaded onto the portable security device 109. The NVM 205 or ROM 204 may also contain private data, such as a private key 209 or a shared secret key 210, stored either in its basic form or in derived quantities.

The portable security device 109 programs 301 may include a cryptography module 213, a user authentication module 215, a communications module 217, and the operating system OS 219.

Thus, the portable security device 109 may receive a document or message via the connector 211. The processor 201, by executing instructions of the cryptography module 213, may digitally sign the document/message or may decrypt the document/message using the private key 209 or shared secret key 210. Using functionality provided through the communications module 217, the processor 201 may receive and transmit communications with the host computer 103.

The technology presented herein is useful for protecting cryptographic devices that employ the Extended Euclidean Algorithm during decryption operations of messages encrypted using cryptography systems based on coding theory, for example, in the manner of the McEliece cryptosystem. The primary purpose of coding theory is not the encryption of message. Rather, it is useful in transmitting messages accurately over communications channel that are not 100% perfect. In summary, a message may be encoded in such a way that even if the message is not received perfectly, the recipient may decode the message. Additional information is attached to each message that allows a recipient to correct a message if some of the bits are incorrectly received. One example of such an error-correcting coding system used for cryptography is the McEliece coding system introduced in 1978 [McEliece]. The McEliece cryptosystem is described very well in [Au] and in [Georgieva].

Figure 4:
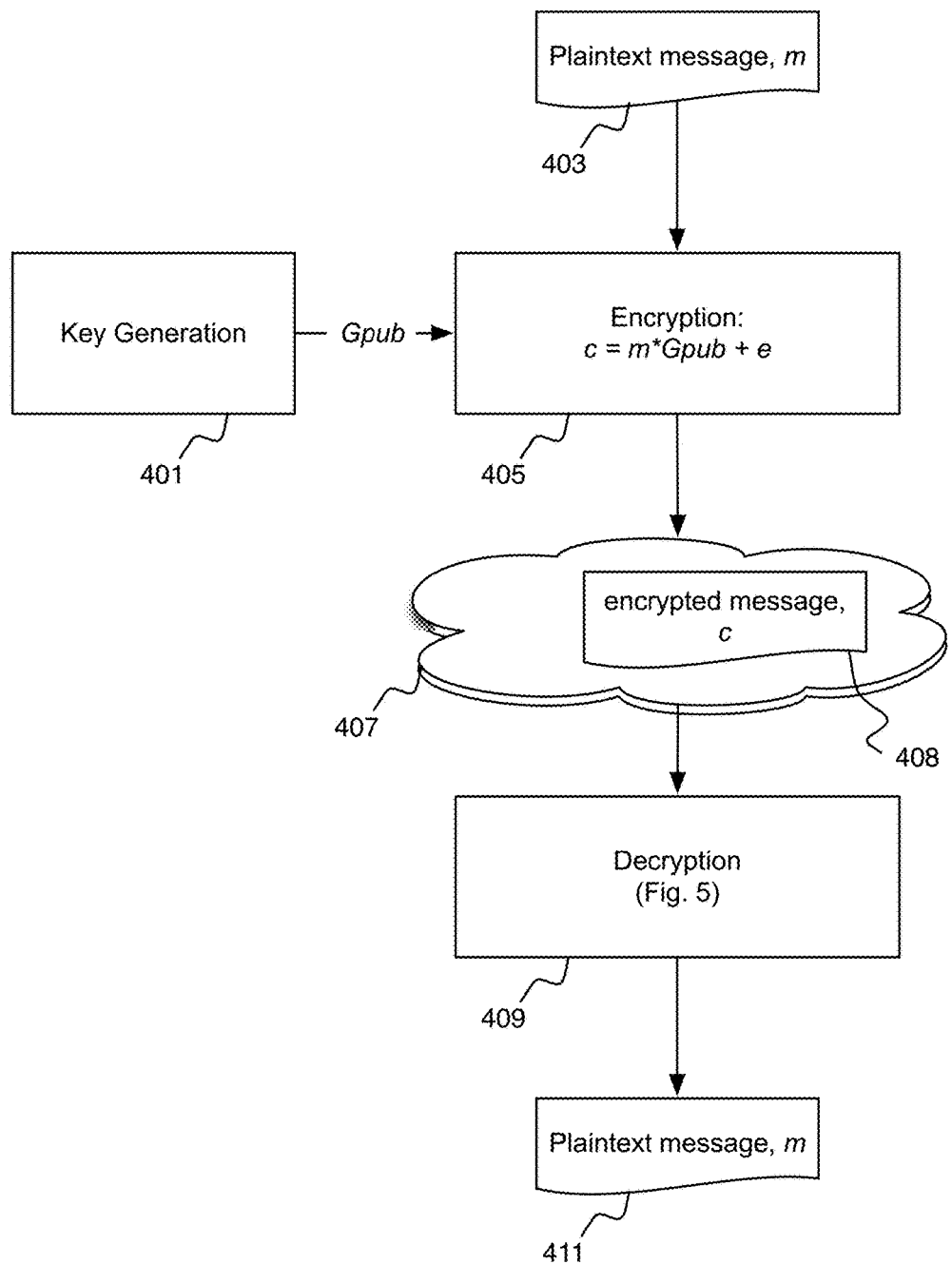
FIG. 4 is a schematic illustration illustrating the encryption and corresponding decryption of a message according to the McEliece cryptography system.

FIG. 4 is a flow-chart illustrating flow from the encryption of a plaintext message m into a code c followed by the decryption of the code c back into the plaintext message m, for example, using the McEliece cryptosystem.

Algorithm 1, below, describes the McEliece cryptosystem instantiated with a binary Goppa code, i.e., q=2. (Details of the McEliece cryptosystem are beyond the scope of this document; the reader is referred to [McEliece], [Georgieva] and [Au] for additional description.) The public key is G, a k×n matrix over a field $\mathbb{F}_q$ of size q whose rows generate a Goppa code of length n and dimension k. G is described by secret elements $X \in \mathbb{F}_{q^m}^n$ and a polynomial $g(z) \in \mathbb{F}_{q^m}[z]$ of degree t wherein m and t are parameters such that n−mt≤0.

---

Algorithm 1 McEliece Cryptosystem

PARAMETERS : Field size q, code length n and dimension k, parameters m,i such that
n − mt ≤ 0. Plaintext space: $\mathscr{F}_q^k$. Ciphertext space: $\mathscr{F}_q^m$.
KEYGEN : Pick a support $x \in \mathscr{F}_{q^m}^{mn}$, a polynominal $g \in \mathscr{F}_{q^m}(x)$ of degree t, G a generator
matrix of $\mathscr{G}(x,g)$, PUBLIC KEY : $G_{pub}$ = SGP, t the correction capacity of the code
$\mathscr{G}(x,g)$.

Algorithm 1 McEliece Cryptosystem

PRIVATE KEY : $T_t$ a t-decoder for $\mathscr{G}(x,g)$, S a random full rank $(n - k) \times (n - k)$ matrix, P a random $n \times n$ permutation matrix.

ENCRYPT :
1: Input $m \in \mathbb{F}_q^k$.
2: Generate random $e \in \mathbb{F}_q^n$ with $w_H(e) = t$.
3: Output $c = mG_{pub} + e$.

DECRYPT :
1: Input $c \in \mathbb{F}_q^n$.
2: Compute $\hat{m} = T_t(cP^{-1})$,
3: If decoding succeeds, output $S^{-1}\hat{m}$, else output $\perp$.

In a key generation step 401, a public key $G_{pub}$ is generated. The public key $G_{pub}$ is generated from a random full rank $(n-k)\times(n-k)$ matrix S, a random $n\times n$ permutation matrix and a generator matrix of $G(x,g)$, such that $G_{pub}$=SGP. The corresponding private key is $T_t$ a t-decoder for $G(x,g)$, S, and P.

A plaintext message $m$ 403$\in \mathbb{F}_q^k$ is encrypted, step 405, by generating a random error $e \in \mathbb{F}_q^k$ having a Hamming weight t. The output encrypted message 408 $c \in \mathbb{F}_q^n$ has the value $c=mG_{pub}+e$.

The encrypted message c 408 is transmitted over a transmission channel, e.g., a network 407, to a recipient. The "transmission" may be the storage of the encrypted message c in a storage medium where the recipient may retrieve it, e.g., on a portable security device 109, which may be a mass storage device or a smart card, for example.

Figure 5:
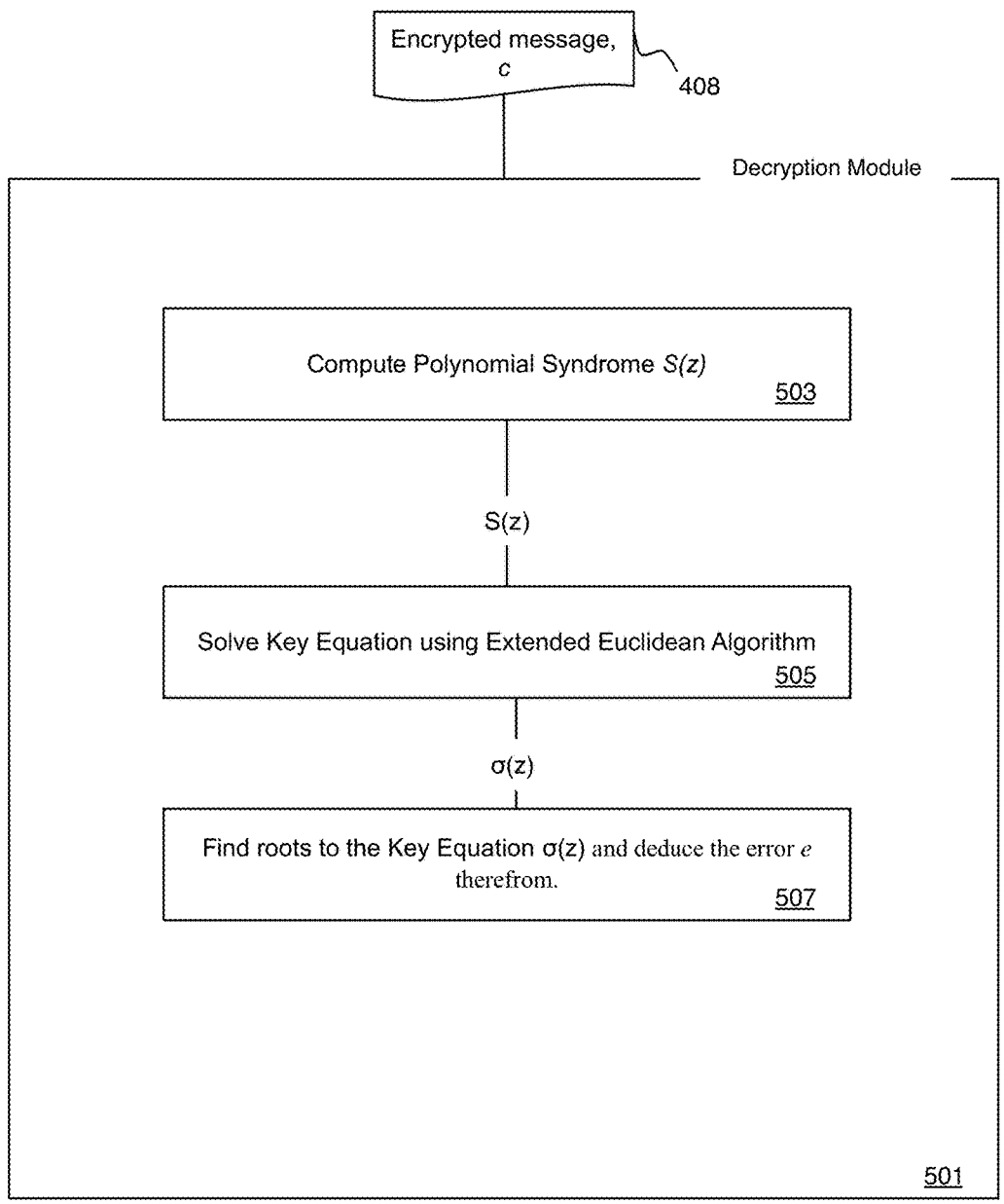
FIG. 5 illustrates the steps involved in decrypting a message encrypted using the McEliece cryptography system.

Decrypting, step 409, the message c 408 back into a plaintext message 411 is illustrated in FIG. 5.

A cryptographic device, e.g., the portable security device 109, receives or retrieves the encrypted message c 408. A decryption module 501 of the cryptography module 213 decrypts the message c 408. There are several possible decoders $T_t$ for a binary Goppa code. Suppose one wants to decode an encoded message $m \in \mathbb{F}_q^k$ with errors e: $c=mG+e$, where the Hamming weight of e (denoted herein as $w_H(e)$) satisfies $w_H \le t$. e may be written as $$e=(\ldots,0,e_{i_1},0,\ldots,0,e_{i_w},0,\ldots).$$

There are several approaches to decrypting a message c 408 that has been encrypted using the McEliece cryptography system. One such method uses the fact that Goppa codes belong to the larger class of alternant codes. That method is referred to herein as the Alternant Decoder. Another one, called the Patterson Algorithm is specific to binary Goppa codes. Common to both are the following high-level steps:

- Compute a polynomial syndrome S(z), Step 503. S(z) is a univariate polynomial deduced from c, but depending solely on e.
- Use the Extended Euclidean Algorithm (EEA) to compute an error locator polynomial $\sigma(z)$, Step 505. The roots of the error locator polynomial $\sigma(z)$ are related to the support elements $x_{ij}$ in the error positions ij.
- Determine the roots of $\sigma(z)$ and deduce the error e therefrom. Step 507. $e \in \mathbb{F}_2^n$ from which it follows that $e_{ij} \ne 0$ implies that $e_{ij} = 1$.

The polynomial syndromes, key equations and their resolutions are specific to each method. Table I, below, summarize for the Alternant Decoder and the Patterson Decoder:

TABLE I

| Alternant Decoder and Patterson Decoder | |
|---|---|
| Alternant Decoder | Patterson Decoder |
| Polynomial syndrome | Polynominal syndrome |
| $S_{Alt,e}(z) = \sum_{\ell=0}^{2t-1} \left(\sum_{i=0}^{n-1} c_i g(x_i)^{-2} x_i^\ell\right) z^\ell.$ | $S_{Gop,e}(z) = \sum_{i=0}^{n-1} \frac{c_i}{z - x_i} \mod g(z).$ |
| Polynomials to be recovered | Polynomials to be recovered |
| $\sigma_{inv,e}(z) = \prod_{j=1}^{w} (1 - zx_{i_j}),$ | $\sigma_e(z) = \prod_{j=1}^{w} (z - x_{i_j}),$ |
| $\omega_{inv,e}(z) = \sum_{j=1}^{w} e_{i_j} g(x_{i_j})^{-1} \prod_{\substack{s=1 \\ s \ne j}}^{w} (1 - zx_{i_s}).$ | $\omega_e(z) = \sum_{j=1}^{w} \prod_{\substack{s=1 \\ s \ne j}}^{w} (z - x_{i_s}).$ |
| Key equation $(\sigma_{inv,e}, \omega_{inv,e})$ unique solution of | Key equation $(\sigma_1, \sigma_2)$ unique solution of |
| $\begin{cases} \omega_{inv,e}(z) = \sigma_{inv}(z) S_{Alt,e}(z) \mod z^{2t}, \\ \deg(\sigma_{inv}) \le \lfloor t/2 \rfloor, \deg(\omega_{inv}) < \lfloor t/2 \rfloor. \end{cases}$ | $\begin{cases} \tau(z)\sigma_2(z) = \sigma_1(z) \mod g(z), \\ \deg(\sigma_1) \le \lfloor t/2 \rfloor, \deg(\sigma_2) < \lfloor t/2 \rfloor, \end{cases}$ $\tau(z) = \sqrt{S_{Gop,e}(z)^{-1} + z} \mod g(z).$ |
| Resolution EEA($z^{2t}$, $S_{Alt,e}$, t) outputs $(\mu\sigma_{inv}, (-1)^N \mu\omega_{inv})$, $\mu \in \mathbb{F}_{q^m}^*$, $N \ge 0$. | Resolution 1. EEA(g(z), $S_{Gop,e}(z)$, 0) outputs $(S_{Gop,e}^{-1} \mod g)$, 2. EEA(g(z), $\tau$, $\lfloor t/2 \rfloor$) outputs $(\sigma_1, \sigma_2)$. |

TABLE I-continued

Alternant Decoder and Patterson Decoder

| Alternant Decoder | Patterson Decoder |
|---|---|
| Error recovery<br>$\sigma_e(z) = z^w \sigma_{inv}(1/z)$.<br>Find the roots of $\sigma_e$. | Error recovery<br>$\sigma_e(z) = \sigma_1(z)^2 + z\sigma_2(z)^2$,<br>$\omega_e = \sigma_e S_e \mod g$.<br>Find the roots of $\sigma_e$. |

Thus, in both the Alternate Decoder and in the Patterson Algorithm, the Extended Euclidean Algorithm plays an important role in determining the error e.

FIG. 6 is a pseudo code 601 of the standard Extended Euclidean Algorithm, also set forth in Table II, below:

TABLE II

Standard Extended Euclidean Algorithm

Input: a(z), b(z), deg(a) ≥ deg(b), $d_{fin}$
Output: u(z), r(z) with b(z)u(z) = r(z) mod a(z) and deg(r) ≤ $d_{fin}$
1: $r_{-1}(z) \leftarrow a(z), r_0(z) \leftarrow b(z), u_{-1}(z) \leftarrow 1, u_0(z) \leftarrow 0$,
2: $i \leftarrow 0$
3: while deg($r_i$(z)) > $d_{fin}$ do
4: $\quad i \leftarrow i + 1$
5: $\quad q_i \leftarrow r_{i-2}(z)/r_{i-1}(z)$
6: $\quad r_i \leftarrow r_{i-2}(z) - q_i(z)r_{i-1}(z)$
7: $\quad u_i \leftarrow u_{i-2}(z) - q_i(z)u_{i-1}(z)$
8: end while
9: $N \leftarrow i$
10: return $u_N(z), r_N(z)$ Inputs to the Extended Euclidean Algorithm (EEA) are the polynomials a(z), b(z), where deg(a)≥deg (b), and $d_{fin}$, the polynomial degree at which a particular invocation of the EEA terminates.

Generally speaking, the EEA produces two polynomials u(z) and r(z) such that b(z)u(z)=r(z) mod a(z) with the deg(r)≤$d_{fin}$.

It should be noted that in the standard EEA consists of a while loop in which successive polynomial divisions are performed. The number of iterations of the while loop depends on the inputs a(z) and b(z). Furthermore, the complexity of the EEA is $(\deg(a)^2)$. For these reasons, the standard form EEA, with a while loop as in Table II, is an attractive target for side-channel attack, because implicit in the above is that decryption is strongly influenced by the error vector.

According to a preferred embodiment, the EEA is performed using an algorithm that avoids the potential of side-channel leakages due to computation flow dependent on the inputs a(z) and b(z). FIG. 7 and Table III present a pseudocode 701 for such an algorithm.

TABLE III

An Extended Euclidean Algorithm with execution flow independent of input polynomials Input: a(z) = $z^{2t}$, b(z) = $S_e$(z), d = 2t
Output: $\hat{U}_d(z) = \mu z^{d-wU(e)+1} \sigma_{inv}(z)$, $\hat{R}_d(z) = \mu z^{d-wU(e)+1} \omega_e(z)$ for some $\mu \in \mathbb{F}_{q^m}^*$.
1: $\hat{R}_{-1}(z) \leftarrow a(z), \hat{R}_0(z) \leftarrow zb(z)$,
2: $\hat{U}_{-1}(z) \leftarrow 1, \hat{U}_0(z) \leftarrow 0$, TABLE III-continued An Extended Euclidean Algorithm with execution flow independent of input polynomials 3: $\delta \leftarrow -1$.
4: for j = 1, ... , d do
5: $\quad \alpha_j \leftarrow \hat{R}_{j-1,d}, \beta_j \leftarrow \hat{R}_{j-2,d}$.
6: $\quad temp_R(z) \leftarrow z(\alpha_j \hat{R}_{j-2}(z) - \beta_j \hat{R}_{j-1}(z))$.
7: $\quad temp_U(z) \leftarrow z(\alpha_j \hat{U}_{j-2}(z) - \beta_j \hat{U}_{j-1}(z))$.
8: $\quad$ if $\alpha_j = 0$ (ie deg($\hat{R}_{j-1}$) < deg($\hat{R}_{j-2}$)) then
9: $\quad\quad \delta \leftarrow \delta + 1$.
10: $\quad$ else
11: $\quad\quad \delta \leftarrow \delta - 1$.
12: $\quad$ end if
13: $\quad$ if $\delta$ < 0 then
14: $\quad\quad (\hat{R}_j(z), \hat{R}_{j-1}(z)) \leftarrow (\hat{R}_{j-1}(z), temp_R)$
15: $\quad\quad (\hat{U}_j(z), \hat{U}_{j-1}(z)) \leftarrow (\hat{U}_{j-1}(z), temp_U)$
16: $\quad\quad \delta \leftarrow 0$.
17: $\quad$ else
18: $\quad\quad (\hat{R}_j(z), \hat{R}_{j-1}(z)) \leftarrow (temp_R, \hat{R}_{j-2}(z))$
19: $\quad\quad (\hat{U}_j(z), \hat{U}_{j-1}(z)) \leftarrow (temp_U, \hat{U}_{j-2}(z))$
20: $\quad\quad \delta \leftarrow \delta$.
21: $\quad$ end if
22: end for
23: return $\hat{U}_d(z), \hat{R}_d(z)$ In the EEA with regular execution flow as illustrated in FIG. 7 (Table III), the while loop from the standard EEA of FIG. 6 (Table II) has been replaced with a for loop that depends solely on the degree of the higher degree input polynomial. Furthermore, regardless of input, the same number and kind of operations are performed. Therefore, the regular flow EEA is less prone to side-channel attack.

As with the standard EEA algorithm (FIG. 6), the modified regular flow EEA algorithm (FIG. 7) accepts three inputs, a first polynomial $\sigma$(z), a second polynomial b(z), and an iteration parameter d. The parameter d is a publically known parameter for the underlying decryption scheme. For example, for the alternant decoder for McEliece codes, the parameter d is 2t. Conversely, for the second EEA computation for the Patterson algorithm, the parameter d is [t/2].

In the pseudocode of FIG. 7 (and Table III), the regular flow EEA is adapted for the Alternant Decoder. Thus, the first input polynomial is $z^{2t}$ and the corresponding termination parameter d is set to 2t, i.e., 2t is the number of iterations in the for loop as compared to in the standard EEA, in which the max number of executions of the while loop is 2t. The second input polynomial is the polynomial syndrome $S_e(z)$ corresponding to the code c, i.e., $$S_e(z) = \Sigma_{l=0}^{2t-1}(\Sigma_{i=0}^{n-1} c_i g(x_i)^{-2} x_i^l)z^l.$$

The for loop is executed 2t times, regardless of the weight of either input polynomial and, thus, is not dependent on the weight of the input polynomials whereas for the standard EEA with a while loop the number of executions of the while loop depends on the inputs a(z) and b(z).

The modified EEA of FIG. 7 may also be used for the second EEA computation of the Patterson algorithm, i.e., $$EEA\left(g(z), \tau, \left\lfloor \frac{t}{2} \right\rfloor\right).$$

The section below entitled Derivation of the Regular Flow EEA illustrates the derivation of the regular flow EEA from the standard EEA and that it is analogous to the standard EEA. As noted there, the output from the standard EEA and the regular flow EEA are related as follows, for some $\mu \in \mathbb{F}_{q^m}^*$:

$$\hat{R}_d(z) = \mu z^{d-w(e)+1} r_N(z)$$

$$\hat{U}_d(z) = \mu z^{d-w(e)+1} u_N(z)$$

where w(e) is the Hamming weight of the error e. The above relationship between the outputs of the regular flow EEA of FIG. 7 and the standard EEA is proved in [Georgieva], incorporated herein by reference.

The coefficient $\mu$ exists, which is a fact that is sufficient to proceed with the McEliece decryption using the Alternant Decoder or for the second EEA computation of the Patterson Algorithm because these decoders are only concerned by the roots of the error locator polynomial $\sigma_e(z)$ (and the roots of the output of EEA may be used to determine the roots of the error locator polynomial $\sigma_e(z)$).

Considering the Relationship $$\hat{U}_d(z) = \mu z^{d-w(e)+1} r_N(z)$$

if 0 is not an element of the support x (the case for the Alternant Decoder or for the second EEA computation of the Patterson Algorithm), then the roots ($\neq 0$) of $\hat{U}_d(z)$ are exactly the same as the roots of $u_N(z) = \sigma_{inv}(z)$ and the roots can therefore be computed from the output of the regular flow modified EEA of FIG. 7.

For example, in the Alternant Decoder, the final step is:

$$\sigma_e(z) = z^{\omega} \sigma_{inv}(1/z)$$

Therefore, the output from the regular flow EEA of FIG. 7 may be used to compute the roots of $\sigma_e(z)$ and then to proceed with the decoding operation to determine the error e.

Derivation of the Regular Flow EEA from the Standard EEA.

Here, we transform smoothly the standard EEA (Alg. 1) into successive version gaining in regularity (Step. 1 and Step. 2). We end up with Alg. 2, which is simpler and more regular than all the previous ones.

Alg. 1 (Standard EEA):

Input: a(z), b(z), deg(a) ≥ deg(b), $d_{fin}$
Output: u(z), r(z) with b(z)u(z) = r(z) mod a(z) and deg(r) ≤ $d_{fin}$
1: $r_{-1}(z) \leftarrow a(z), r_0(z) \leftarrow b(z), u_{-1}(z) \leftarrow 1, u_0(z) \leftarrow 0,$
2: $i \leftarrow 0$
3: while deg($r_i(z)$) > $d_{fin}$ do -continued 4:    $i \leftarrow i + 1$
5:    $q_i \leftarrow r_{i-2}(z)/r_{i-1}(z)$
6:    $r_i \leftarrow r_{i-2}(z) - q_i(z)r_{i-1}(z)$
7:    $u_i \leftarrow u_{i-2}(z) - q_i(z)u_{i-1}(z)$
8: end while
9: $N \leftarrow i$
10: return $u_N(z), r_N(z)$ Step 1 (Unrolling Euclidean Division).

We decompose each Euclidian division into a number of polynomial subtractions. The idea is to kill the highest degree term without performing field division depending only on $\delta_i = \deg(q_i(z)) = \deg(r_{i-2}) - \deg(r_{i-1})$. We explicit the intermediate values of the Euclidean division of $R_{i-2}(z)$ by $R_{i-1}(z)$, that we denote by $R_i^{(0)}(z), R_i^{(\delta_i+1)}(z)$. To do so, we eliminate in each $R_i^{(j)}(z)$ (for $0 \leq j \leq \delta_i+1$) the term $z^{d_{i-2}-j}$, whether the associated coefficient is zero or not. This is why we perform the Euclidean divisions in a way to avoid the divisions by field elements. Consequently, the outputs are multiple of the outputs of Alg. 1 with the same inputs and $\Delta_i = \deg(R_{i-2}) - \deg(R_{i-1}) = \deg(r_{i-2}) - \deg(r_{i-1}) = \delta_i$ Alg. 2 (Euclidean division in left and step 1 (number of polynomial subtractions) in right):

| | |
|---|---|
| 1: while deg($r_i(z)$) > $d_{fin}$ do | 1: while deg($R_i(z)$) > $d_{fin}$ do |
| 2:   $i \leftarrow i + 1$ | 2:   $i \leftarrow i + 1$ |
| 3:   $q_i \leftarrow r_{i-2}(z)/r_{i-1}(z)$ | 3:   $R_{i-2}^{(0)}(z) \leftarrow R_{i-2}(z), \beta_i \leftarrow$ LC ($R_{i-1}(z)$) |
| 4:   $r_i \leftarrow r_{i-2}(z) - q_i(z)r_{i-1}(z)$ | 4:   $\Delta_i \leftarrow \deg(R_{i-2}) - \deg(R_{i-1})$ |
| 5: end while | 5:   for $j = 0,...,\Delta_i$ do |
| | 6:     $\alpha_{i,j} \leftarrow R_{i,dj-2-j}^{(j)}$ |
| | 7:     $R_{i-2}^{(j+1)}(z) \leftarrow \beta_i R_{i-2}^{(j)}(z) - \alpha_{i,j} z^{\Delta_i - j} R_{i-1}(z)$ |
| | 8:   end for |
| | 9:   $R_i(z) \leftarrow R_{i-2}^{(\Delta_i+1)}(z),$ |
| | 10: end while |

Proposition 1: (Comparison of Alg. 1 and 2). Let a(z) and b(z) be two polynomials with deg(a(z)) ≥ deg(a(z)) and d a non-negative integer. $u_i(z), v_i(z), r_i(z), q_i(z)$ are intermediate values in Alg. 1, and. $U_i(z), V_i(z), R_i(z)$, are intermediate values in Alg. 2. It holds that, for all $i = -1, \ldots, N$, there exists $\lambda_i \in \mathbb{F}_{q^m}^*$ such that:

$$R_i(z) = \lambda_i r_i(z),$$

$$U_i(z) = \lambda_i u_i(z)$$

As a consequence, $$\Delta_i = \deg(R_{i-2}) - \deg(R_{i-1}) = \deg(r_{i-2}) - \deg(r_{i-1}) = \delta_i \text{ for all } i$$

There are two problems with Step 1. The first problem is that the inner for loop has a variable length, and contains a multiplication $z^{\delta_i - (j-1)} R_i(z)$, which depends on the iteration (we can kill accidentally not only the higher degree term but also terms of lower degree, which should be retained), which will produce a recognizable pattern. The second problem is that the while loop leads to a variable number of operations according to the input. It is not realizable because it requires that EEA has already been executed and observed. However, it is useful as an intermediate step leading to Step 2, described below.

Step 2 (Regular Polynomial Shift Pattern)

We perform the Euclidean division in such way that we only multiply the operand by z at each for iteration. This can be done by splitting each Euclidean division into two phases.

The first phase L1 "re-aligns" the operands $\tilde{R}_{i-2}$ and $\tilde{R}_{i-1}$ so that they both have same degree d=deg $(R_{-1}(z))(=2t)$. Doing so, the second phase L2 computes the polynomial subtractions (corresponding to Steps 1 and perform a shift "re-aligning" of the operands. A consequence is that the polynomials $\tilde{R}_i(z)$ are of the form $z^{ki} R_i(z)$ and the degrees $d_i$ are lost. N is the number of iterations in the while loop of EEA and $\Delta_i$ is the value of deg($R_{i-2}$)–deg($R_{i-1}$) during the execution of EEA with step 1.

Step 2 (Pseudocode):

```
 1: for i = 1,...,N do
 2:     R̃_{i-2}^(0)(z) ← R̃_{i-2}(z),
 3:     for i = 1,...,Δ_i - 1 do       ⎫
 4:         R̃_{i-1}(z) ← zR̃_{i-1}(z)   ⎬ L1
 5:     end for                        ⎭
 6:     for j = 0,...,Δ_i do           ⎫
 7:         α̃_{i,j} ← R̃_{i,d}^(j), β̃_i ← R̃_{i-1,d}.  ⎪
 8:         R̃_{i-2}^(j+1)(z) ←           ⎬ L2
              z(β̃_i R̃_{i-2}^(j)(z) - α̃_{i,j} R̃_{i-1}(z))  ⎪
 9:     end for                        ⎪
10:     R̃_i(z) ← R̃_{i-2}^(Δ_i+1)(z),   ⎭
11: end for
```

Example of polynomial subtractions (Step 1) and multiplication of the operand by z (Step 2):

$$z^4 = (\alpha^4 z^2 + z + \alpha^{13})(\alpha^{11} z^2 + \alpha^7 z + \alpha^{11}) + (\alpha^3 z + \alpha^9)$$

$$z^4 \quad \alpha^{11} z^2 + \alpha^7 z + \alpha^{11}$$

$$\frac{\alpha^{11}(z^4) - z^2(\alpha^{11} z^2 + \alpha^7 z + \alpha^{11})}{\alpha^7 z^3 + \alpha^{11} z^2}$$

$$\frac{\alpha^{11}(\alpha^7 z^3 + \alpha^{11} z^2) - \alpha^7 z(\alpha^{11} z^2 + \alpha^7 z + \alpha^{11})}{\alpha z^2 + \alpha^3 z}$$

$$\frac{\alpha^{11}(\alpha z^2 + \alpha^3 z) - \alpha(\alpha^{11} z^2 + \alpha^7 z + \alpha^{11})}{\alpha^6 z + \alpha^{12}}$$

$$z^4 \quad \alpha^{11} z^2 + \alpha^7 z + \alpha^{11}$$

$$\frac{z(0/(z^4) - 1 \times (\alpha^{11} z^2 + \alpha^7 z + \alpha^{11}))}{\alpha^{11} z^5 + \alpha^7 z^2 + \alpha^{11} z^1}$$

$$\frac{z(0 \times (z^4) - 1 \times (\alpha^{11} z^3 + \alpha^7 z^2 + \alpha^{11} z^1))}{\alpha^{11} z^4 + \alpha^7 z^3 + \alpha^{11} z^2}$$

$$\frac{z(\alpha^{11}(z^4) - 1 \times (\alpha^{11} z^4 + \alpha^7 z^3 + \alpha^{11} z^2))}{\alpha^7 z^4 + \alpha^{11} z^3}$$

$$\frac{z(\alpha^7(\alpha^{11} z^4 + \alpha^7 z^3 + \alpha^{11} z^2) - \alpha^{11}(\alpha^7 z^4 + \alpha^{11} z^3))}{\alpha z^4 + \alpha^3 z^3}$$

$$\frac{z(\alpha(\alpha^{11} z^4 + \alpha^7 z^3 + \alpha^{11} z^2) - \alpha^{11}(\alpha z^4 + \alpha^3 z^3))}{\alpha^6 z^4 + \alpha^{12} z^3}$$

Complete Regular Flow EEA.

To design a real constant flow algorithm, we merge the loops L1 and L2 in a common pattern so as to be indistinguishable (Steps 5 to 7 of Alg. 3). They differentiate by the assignments, which are performed in Steps 14-15 and 18-19. To know when polynomials subtractions have to be stopped, we collect in a counter δ the number of shifts necessary to re-align the operands. To design an algorithm with regular pattern we use the fact that $\Sigma_i^N \delta_i = w(e) - 1$, therefore, the number of iterations can be safely set to the maximum value (i.e., 2t to decode the errors with w(e)=t)), and the while loop is replaced by a for loop.

Complete Regular Flow Extended Euclidean Algorithm (Alg. 3):

```
Input: a(z) = z^{2t}, b(z) = S_e(z), d = 2t
Output: Û_d(z) = μz^{d-wU(e)+1} σ_{inv}(z), R̂_d(z) = μz^{d-wU(e)+1} ω_e(z) for some μ ∈ F_q^m*.
 1: R̂_{-1}(z) ← a(z), R̂_0(z) ← zb(z),
 2: Û_{-1}(z) ← 1, Û_0(z) ← 0,
 3: δ ← -1.
 4: for j = 1, ... , d do                                    ⎫
 5:     α_j ← R̂_{j-1,d}, β_j ← R̂_{j-2,d}.                    ⎪
 6:     temp_R(z) ← z(α_j R̂_{j-2}(z) - β_j R̂_{j-1}(z)).      ⎪
 7:     temp_U(z) ← z(α_j Û_{j-2}(z) - β_j Û_{j-1}(z)).      ⎪
 8:     if α_j = 0 (ie deg(R̂_{j-1}) < deg(R̂_{j-2})) then     ⎪
 9:         δ ← δ + 1.                                       ⎪
10:     else                                                 ⎪
11:         δ ← δ - 1.                                       ⎪
12:     end if                                               ⎬ L
13:     if δ < 0 then                                        ⎪
14:         (R̂_j(z), R̂_{j-1}(z)) ← (R̂_{j-1}(z), temp_R)       ⎪
15:         (Û_j(z), Û_{j-1}(z)) ← (Û_{j-1}(z), temp_U)       ⎪
16:         δ ← 0.                                           ⎪
17:     else                                                 ⎪
18:         (R̂_j(z), R̂_{j-1}(z)) ← (temp_R, R̂_{j-2}(z))       ⎪
19:         (Û_j(z), Û_{j-1}(z)) ← (temp_U, Û_{j-2}(z))       ⎪
20:         δ ← δ.                                           ⎪
21:     end if                                               ⎪
22: end for                                                  ⎭
23: return Û_d(z), R̂_d(z)
```

Proposition 2. (Comparison of standard EEA and modified regular flow EEA). For each I=1, . . . , N, after step 21 (FIG. 7), it holds that:

$$\hat{R}_2(\delta_1 + \ldots + \delta_i) = z^{d-d_{i-1}} R_i(z)$$

$$\hat{U}_2(\delta_1 + \ldots + \delta_i) = z^{d-d_{i-1}} U_i(z)$$

The outputs of Alg. 1 and Alg. 3 are related such as:

$$\hat{R}_d(z) = \mu z^{d-w(e)+1} r_N(z)$$

$$\hat{U}_d(z) = \mu z^{d-w(e)+1} u_N(z)$$

wherein w(e) is the Hamming weight of the error.

Therefore, provided 0 is not an element of the support x, then the algorithm allows to recover the error positions without ambiguity. Transposing this result to Patterson decoding requires adapting both EEA's. The adaptation of the second one is straightforward. For the first one (syndrome inversion), a problem arises: z can be multiplier of the output, and we found no way of determining when z is a factor of $S^{-1}(z)$ mod g.

CONCLUDING REMARKS

A technology has been presented which delinks the computation flow of the EEA algorithm from the inputs to the EEA algorithm as may be required in certain code based cryptography systems, e.g., the McEliece cryptosystem. EEA computation is, for example, required in the decryption of McEliece codes. By utilizing such a regular flow EEA computation in a cryptography device, for example, a secure portable device, the cryptography device is less vulnerable to side-channel attack and, therefore, more secure when performing McEliece decryption.

Although specific embodiments of the invention have been described and illustrated, the invention is not to be limited to the specific forms or arrangements of parts so described and illustrated. The invention is limited only by the claims.

The invention claimed is:

1. A method for protecting a cryptography device against side-channel attack while performing decryption according to a specified encryption scheme thereby rendering the cryptography device less vulnerable to attacks designed to cause the cryptography device to reveal information an attacker may use to discern cryptographic material stored on the cryptography device, the method comprising:
   receiving by the processor a code c, wherein c is a function of a key pair (having a public key and a secret key) and an error e;
   decrypting by the processor the code c by deriving the error e by:
      computing a polynomial syndrome S(z) which is a univariate polynomial deduced from c, but depending only on e,
      using a modified Extended Euclidean Algorithm having inputs a(z), b(z), and d, where a(z) and b(z) are polynomials and d is a public parameter of the encryption scheme to compute an error locator polynomial σ(z), by:
         iteratively performing a computation L a number of times defined by the parameter d, the computation L performing a fixed number of arithmetic operations regardless of Hamming weight of inputs a(z) and b(z), the arithmetic operations performing polynomial subtraction operations resulting in a result related to the result of a standard Extended Euclidean Algorithm,
      finding by the processor roots of σ(z); and
      inferring by the processor the error e from the roots of σ(z).

2. The method for protecting a cryptography device performing decryption using an Extended Euclidean Algorithm against side-channel attack of claim 1 wherein the modified Extended Euclidean Algorithm produces a result related to the Extended Euclidean Algorithm formulated as follows:
Extended Euclidean Algorithm (EEA):

Input: a(z), b(z), deg(a) ≥ deg(b), $d_{fin}$
Output: u(z), r(z) with b(z)u(z) = r(z) mod a(z) and deg(r) ≤ $d_{fin}$
1: $r_{-1}(z) \leftarrow a(z), r_0(z) \leftarrow b(z), u_{-1}(z) \leftarrow 1, u_0(z) \leftarrow 0$,
2: $i \leftarrow 0$
3: while deg($r_i(z)$) > $d_{fin}$ do
4:    $i \leftarrow i + 1$
5:    $q_i \leftarrow r_{i-2}(z)/r_{i-1}(z)$
6:    $r_i \leftarrow r_{i-2}(z) - q_i(z)r_{i-1}(z)$
7:    $u_i \leftarrow u_{i-2}(z) - q_i(z)u_{i-1}(z)$
8: end while
9: $N \leftarrow i$
10: return $u_N(z), r_N(z)$ wherein $d_{fin} = 1/2\ d$, i.e., $d_{fin}$ equals to ½ the public parameter d of the encryption scheme,
and the computation L is related to the while loop in the Extended Euclidean Algorithm such that polynomials $u_n(z)$ and $r_n(z)$ may be derived from the outputs of the modified Extended Euclidean Algorithm.

3. The method for protecting a cryptography device performing decryption using an Extended Euclidean Algorithm against side-channel attack of claim 2 wherein the operation L has the form:

1: $\hat{R}_{-1}(z) \leftarrow a(z), \hat{R}_0(z) \leftarrow zb(z)$,
2: $\hat{U}_{-1}(z) \leftarrow 1, \hat{U}_0(z) \leftarrow 0$,
3: $\delta \leftarrow -1$.
4: for j = 1, ... , d do
5:    $\alpha_j \leftarrow \hat{R}_{j-1,d}, \beta_j \leftarrow \hat{R}_{j-2,d}$.
6:    $temp_R(z) \leftarrow z(\alpha_j\hat{R}_{j-2}(z) - \beta_j\hat{R}_{j-1}(z))$.
7:    $temp_U(z) \leftarrow z(\alpha_j\hat{U}_{j-2}(z) - \beta_j\hat{U}_{j-1}(z))$.
8:    if $\alpha_j = 0$ (ie deg($\hat{R}_{j-1}$) < deg($\hat{R}_{j-2}$)) then
9:       $\delta \leftarrow \delta + 1$.
10:   else
11:      $\delta \leftarrow \delta - 1$.
12:   end if
13:   if $\delta < 0$ then
14:      $(\hat{R}_j(z), \hat{R}_{j-1}(z)) \leftarrow (\hat{R}_{j-1}(z), temp_R)$
15:      $(\hat{U}_j(z), \hat{U}_{j-1}(z)) \leftarrow (\hat{U}_{j-1}(z), temp_U)$
16:      $\delta \leftarrow 0$.
17:   else
18:      $(\hat{R}_j(z), \hat{R}_{j-1}(z)) \leftarrow (temp_R, \hat{R}_{j-2}(z))$
19:      $(\hat{U}_j(z), \hat{U}_{j-1}(z)) \leftarrow (temp_U, \hat{U}_{j-2}(z))$
20:      $\delta \leftarrow \delta$.
21:   end if
22: end for
23: return $\hat{U}_d(z), \hat{R}_d(z)$.

4. The method for protecting a cryptography device performing decryption using an Extended Euclidean Algorithm against side-channel attack of claim 3 wherein $r_N(z)$, and $u_N(z)$, are related to $\hat{R}_d(z)$ and $\hat{U}_d(z)$ as follows:

$\hat{R}_d(z) = \mu z^{d-w(e)+1} r_N(z)$ $\hat{U}_d(z) = \mu z^{d-w(e)+1} u_N(z)$.

5. The method for protecting a cryptography device performing decryption using an Extended Euclidean Algorithm against side-channel attack of claim 1 wherein the EEA is used in an Alternant decoder and the EEA is used to compute the error locator polynomial a(z), wherein the polynomial a(z) is $z^{2t}$ and the polynomial b(z) is S(z), and d is 2t.s.

6. The method for protecting a cryptography device performing decryption using an Extended Euclidean Algorithm against side-channel attack of claim 1 wherein the EEA is used in a Patterson algorithm decoder and the EEA is used to compute the error locator polynomial σ(z), wherein the polynomial a(z) is g(z) and the polynomial b(z) is τ, d=t, $\tau = \sqrt{S(z)^{-1} + 1}$ mod g(z), and g(z) is a generator function from which the public key is generated.

7. A cryptographic device protected against side-channel attacks while performing decryption according to a specified encryption scheme thereby rendering the cryptography device less vulnerable to attacks designed to cause the cryptography device to reveal information an attacker may use to discern cryptographic material stored on the cryptography device, comprising:

a processor;

a memory connected to the processor and comprising instructions executable by the processor, the instructions including instructions to cause the processor to:

receiving by the processor a code c, wherein c is a function of a key pair (having a public key and a secret key) and an error e;

decrypting by the processor the code c by deriving the error e by:

computing a polynomial syndrome S(z) which is a univariate polynomial deduced from c, but depending only on e, using a modified Extended Euclidean Algorithm having inputs a(z), b(z), and d, where a(z) and b(z) are polynomials and d is a public parameter of the encryption scheme to compute an error locator polynomial α(z), by:

iteratively performing a computation L a number of times defined by the termination criteria d, the computation L performing a fixed number of arithmetic operations regardless of Hamming weight of inputs a(z) and b(z), the arithmetic operations performing polynomial subtraction operations resulting in a result related to the result of a standard Extended Euclidean Algorithm, finding by the processor roots of σ(z); and inferring by the processor the error e from the roots of σ(z).

8. The cryptographic device protected against side-channel attacks of claim 7 wherein the modified Extended Euclidean Algorithm produces a result related to the Extended Euclidean Algorithm formulated as follows:

Extended Euclidean Algorithm (EEA):

---

Input: a(z), b(z), deg(a) ≥ deg(b), $d_{fin}$
Output: u(z), r(z) with b(z)u(z) ≡ r(z) mod a(z) and deg(r) ≤ $d_{fin}$
1: $r_{-1}(z) \leftarrow a(z), r_0(z) \leftarrow b(z), u_{-1}(z) \leftarrow 1, u_0(z) \leftarrow 0$,
2: i ← 0
3: while deg($r_i(z)$) > $d_{fin}$ do
4:    i ← i + 1
5:    $q_i \leftarrow r_{i-2}(z)/r_{i-1}(z)$
6:    $r_i \leftarrow r_{i-2}(z) - q_i(z)r_{i-1}(z)$
7:    $u_i \leftarrow u_{i-2}(z) - q_i(z)u_{i-1}(z)$
8: end while
9: N ← i
10: return $u_N(z), r_N(z)$

--- and the computation L is related to the while loop in the Extended Euclidean Algorithm such that polynomials $u_n(z)$ and $r_n(z)$ may be derived from the outputs of the modified Extended Euclidean Algorithm.

9. The cryptographic device protected against side-channel attacks of claim 8 wherein the operation L has the form:

---

1: $\hat{R}_{-1}(z) \leftarrow a(z), \hat{R}_0(z) \leftarrow zb(z),$
2: $\hat{U}_{-1}(z) \leftarrow 1, \hat{U}_0(z) \leftarrow 0,$
3: $\delta \leftarrow -1.$
4: for j = 1, ..., d do
5:    $\alpha_j \leftarrow \hat{R}_{j-1,d}, \beta_j \leftarrow \hat{R}_{j-2,d}.$
6:    $\text{temp}_R(z) \leftarrow z(\alpha_j \hat{R}_{j-2}(z) - \beta_j \hat{R}_{j-1}(z)).$
7:    $\text{temp}_U(z) \leftarrow z(\alpha_j \hat{U}_{j-2}(z) - \beta_j \hat{U}_{j-1}(z)).$
8:    if $\alpha_j = 0$ (ie deg($\hat{R}_{j-1}$) < deg($\hat{R}_{j-2}$)) then
9:        $\delta \leftarrow \delta + 1.$
10:   else
11:       $\delta \leftarrow \delta - 1.$
12:   end if
13:   if $\delta < 0$ then
14:       $(\hat{R}_j(z), \hat{R}_{j-1}(z)) \leftarrow (\hat{R}_{j-1}(z), \text{temp}_R)$
15:       $(\hat{U}_j(z), \hat{U}_{j-1}(z)) \leftarrow (\hat{U}_{j-1}(z), \text{temp}_U)$
16:       $\delta \leftarrow 0.$
17:   else
18:       $(\hat{R}_j(z), \hat{R}_{j-1}(z)) \leftarrow (\text{temp}_R, \hat{R}_{j-2}(z))$
19:       $(\hat{U}_j(z), \hat{U}_{j-1}(z)) \leftarrow (\text{temp}_U, \hat{U}_{j-2}(z))$
20:       $\delta \leftarrow \delta.$
21:   end if
22: end for
23: return $\hat{U}_d(z), \hat{R}_d(z).$

---

10. The cryptographic device protected against side-channel attacks of claim 8 wherein $r_n(z)$, and $u_n(z)$, are related to $\hat{R}_d(z)$ and $\hat{U}_d(z)$ as follows:

$$\hat{R}_d(z) = \mu z^{d-w(e)+1} r_N(z)$$

$$\hat{U}_d(z) = \mu z^{d-w(e)+1} u_N(z).$$

11. The cryptographic device protected against side-channel attacks of claim 7 wherein the EEA is used in an Alternant decoder and the EEA is used to compute the error locator polynomial σ(z), wherein the polynomial a(z) is $z^{2t}$, the polynomial b(z) is S(z), and d is 2t.

12. The cryptographic device protected against side-channel attacks of claim 7 wherein the EEA is used in a Patterson algorithm decoder and the EEA is used to compute the error locator polynomial σ(z), wherein the polynomial a(z) is g(z) and the polynomial b(z) is τ, d is t, $\tau = \sqrt{S(z)^{-1}+1}$ mod g(z), and g(z) is a generator function from which the public key is generated.

13. The cryptographic device protected against side-channel attacks of claim 7 wherein the cryptographic device is a smart card.

14. The cryptographic device protected against side-channel attacks of claim 7 wherein the cryptographic device is a mobile device.

15. A non-transitory computer readable storage medium storing instructions protecting a cryptography device against side-channel attack while performing decryption according to a specified encryption scheme thereby rendering the cryptography device less vulnerable to attacks designed to cause the cryptography device to reveal information an attacker may use to discern cryptographic material stored on the cryptography device, the instructions operable to cause a processor of a cryptographic device, when loaded onto and executed by the processor of the cryptographic device, to:

receive a code c, wherein c is a function of a key pair (having a public key and a secret key) and an error e;
decrypt the code c by deriving the error e by:
  computing a polynomial syndrome S(z) which is a univariate polynomial deduced from c, but depending only on e,
  using a modified Extended Euclidean Algorithm having inputs a(z), b(z), and d, where a(z) and b(z) are polynomials and d is a public parameter of the encryption scheme to compute an error locator polynomial $\sigma(z)$, by:
    iteratively performing a computation L a number of times defined by the termination criteria d, the computation L performing a fixed number of arithmetic operations regardless of Hamming weight of inputs a(z) and b(z), the arithmetic operations performing polynomial subtraction operations resulting in a result related to the result of a standard Extended Euclidean Algorithm,
  finding by the processor roots of $\sigma(z)$; and
  inferring by the processor the error e from the roots of $\sigma(z)$.

16. The computer readable storage medium of claim 15 wherein the modified Extended Euclidean Algorithm produces a result related to the Extended Euclidean Algorithm formulated as follows:

Extended Euclidean Algorithm (EEA):

```
Input:  a(z), b(z), deg(a) ≥ deg(b), d_fin
Output: u(z), r(z) with b(z)u(z) = r(z) mod a(z) and deg(r) ≤ d_fin
 1: r_{-1}(z) ← a(z), r_0(z) ← b(z), u_{-1}(z) ← 1, u_0(z) ← 0,
 2: i ← 0
 3: while deg(r_i(z)) > d_fin do
 4:   i ← i + 1
 5:   q_i ← r_{i-2}(z)/r_{i-1}(z)
 6:   r_i ← r_{i-2}(z) − q_i(z)r_{i-1}(z)
 7:   u_i ← u_{i-2}(z) − q_i(z)u_{i-1}(z)
 8: end while
 9: N ← i
10: return u_N(z), r_N(z)
``` and the computation L is equivalent to the while loop in the Extended Euclidean Algorithm such that polynomials $u_n(z)$ and $r_n(z)$ may be derived from the outputs of the modified Extended Euclidean Algorithm.

17. The computer readable storage medium of claim 16 wherein the operation L has the form:

```
 1: R̂_{-1}(z) ← a(z), R̂_0(z) ← zb(z),
 2: Û_{-1}(z) ← 1, Û_0(z) ← 0,
 3: δ ← −1.
 4: for j = 1, ..., d do
 5:   α_j ← R̂_{j-1,d}, β_j ← R̂_{j-2,d}.
 6:   temp_R(z) ← z(α_j R̂_{j-2}(z) − β_j R̂_{j-1}(z)).
 7:   temp_U(z) ← z(α_j Û_{j-2}(z) − β_j Û_{j-1}(z)).
 8:   if α_j = 0 (ie deg(R̂_{j-1}) < deg(R̂_{j-2})) then
 9:     δ ← δ + 1.
10:   else
11:     δ ← δ − 1.
12:   end if
13:   if δ < 0 then
14:     (R̂_j(z), R̂_{j-1}(z)) ← (R̂_{j-1}(z), temp_R)
15:     (Û_j(z), Û_{j-1}(z)) ← (Û_{j-1}(z), temp_U)
16:     δ ← 0.
17:   else
18:     (R̂_j(z), R̂_{j-1}(z)) ← (temp_R, R̂_{j-2}(z))
19:     (Û_j(z), Û_{j-1}(z)) ← (temp_U, Û_{j-2}(z))
20:     δ ← δ.
21:   end if
22: end for
23: return Û_d(z), R̂_d(z).
```
} L

18. The computer readable storage medium of claim 16 wherein $r_n(z)$, and $u_n(z)$, are related to $\hat{R}_d(z)$ and $\hat{U}_d(z)$ as follows:

$$\hat{R}_d(z) = \mu z^{d-w(e)+1} r_N(z)$$

$$\hat{U}_d(z) = \mu z^{d-w(e)+1} u_N(z).$$

19. The computer readable storage medium of claim 15 wherein the EEA is used in an Alternant decoder and the EEA is used to compute the error locator polynomial $\sigma(z)$, wherein the polynomial a(z) is $z^{2t}$, the polynomial b(z) is S(z), and d=2t.

20. The computer readable storage medium of claim 15 wherein the EEA is used in a Patterson algorithm decoder and the EEA is used to compute the error locator polynomial $\sigma(z)$, wherein the polynomial a(z) is g(z) and the polynomial b(z) is $\tau$; d is t and wherein $\tau = \sqrt{S(z)^{-1}+1}$ mod g(z) and g(z) is a generator function from which the public key is generated.

* * * * *